(12) United States Patent
Endo et al.

(10) Patent No.: US 7,961,161 B2
(45) Date of Patent: Jun. 14, 2011

(54) DISPLAY SYSTEM COMPRISING A MIRROR DEVICE WITH MICROMIRRORS CONTROLLED TO OPERATE IN INTERMEDIATE OSCILLATING STATE

(75) Inventors: Taro Endo, Chofu (JP); Yoshihiro Maeda, Hachioji (JP); Kazuma Arai, Hachioji (JP); Fusao Ishii, Menlo Park, CA (US)

(73) Assignees: Silicon Quest Kabushiki-Kaisha (JP); Olympus Corporation (JP)

( * ) Notice: Subject to any disclaimer, the term of this patent is extended or adjusted under 35 U.S.C. 154(b) by 632 days.

(21) Appl. No.: 12/074,098

(22) Filed: Mar. 1, 2008

(65) Prior Publication Data
US 2008/0246783 A1    Oct. 9, 2008

Related U.S. Application Data

(60) Provisional application No. 60/904,565, filed on Mar. 2, 2007.

(51) Int. Cl.
*G09G 5/00*    (2006.01)
(52) U.S. Cl. ............................. 345/84; 345/204; 359/237
(58) Field of Classification Search .................... 345/84, 345/204, 207; 359/237, 290, 291
See application file for complete search history.

(56) References Cited

U.S. PATENT DOCUMENTS

| | | | |
|---|---|---|---|
| 5,214,420 A | 5/1993 | Thompson et al. | |
| 5,285,407 A | 2/1994 | Gale et al. | |
| 5,287,096 A | 2/1994 | Thompson et al. | |
| 5,589,852 A | 12/1996 | Thompson et al. | |
| 5,614,921 A | 3/1997 | Conner et al. | |
| 5,619,228 A | 4/1997 | Doherty | |
| 5,751,264 A | 5/1998 | Cavallerano et al. | |
| 5,767,828 A | 6/1998 | McKnight | |
| 6,061,049 A | 5/2000 | Pettitt et al. | |
| 6,600,591 B2 | 7/2003 | Anderson et al. | |
| 6,999,224 B2 | 2/2006 | Huibers | |
| 7,075,693 B2 | 7/2006 | Ljungblad | |
| 7,095,494 B2 | 8/2006 | Mehrl et al. | |
| 7,345,806 B2 | 3/2008 | Simonian et al. | |
| 2005/0190429 A1 | 9/2005 | Ishii | |
| 2005/0206992 A1 | 9/2005 | Ishii | |
| 2005/0254116 A1 | 11/2005 | Ishii | |
| 2008/0007576 A1 | 1/2008 | Ishii | |

*Primary Examiner* — Amare Mengistu
*Assistant Examiner* — Stacy Khoo
(74) *Attorney, Agent, or Firm* — Bo-In Lin

(57) ABSTRACT

A display system includes a spatial light modulator for displaying a image by the modulation state of a plurality of micromirrors, and a control device for controlling the spatial light modulator. The control device includes a data conversion device for converting the digital image data into non-binary data, and a modulation-control device for generating a modulation control signal for micromirrors depending on the non-binary data, and controlling the spatial light modulator. The modulation state of the micromirrors by the modulation control signal includes modulation by oscillation of the micromirrors. The modulation control signal controls amplitude of the oscillation to be smaller than the maximum amplitude of the micromirrors in the modulation by the oscillation of the micromirrors. The oscillation having smaller amplitude than the maximum amplitude of the micromirrors is repeated by the modulation control signal in an optional time duration or frequency.

8 Claims, 17 Drawing Sheets

Fig. 1A (Prior Art)
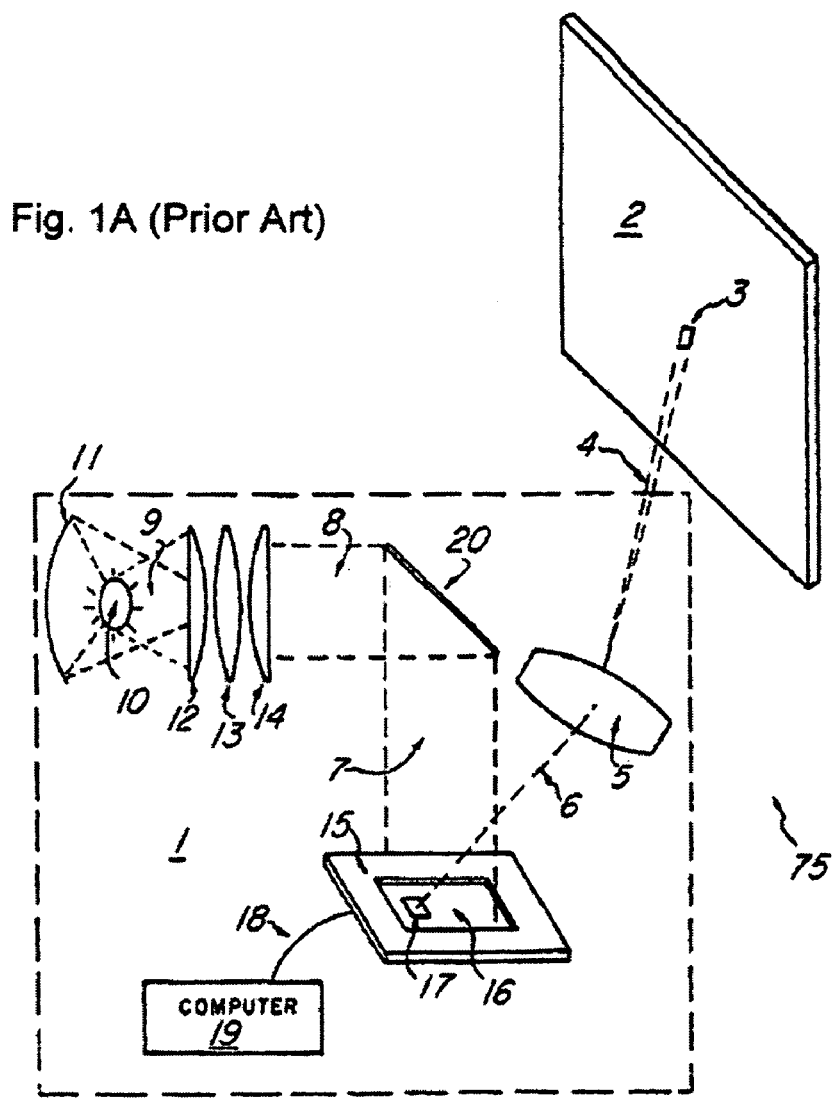
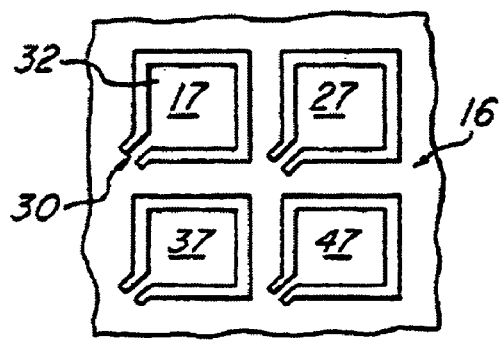
Fig. 1B (Prior Art)

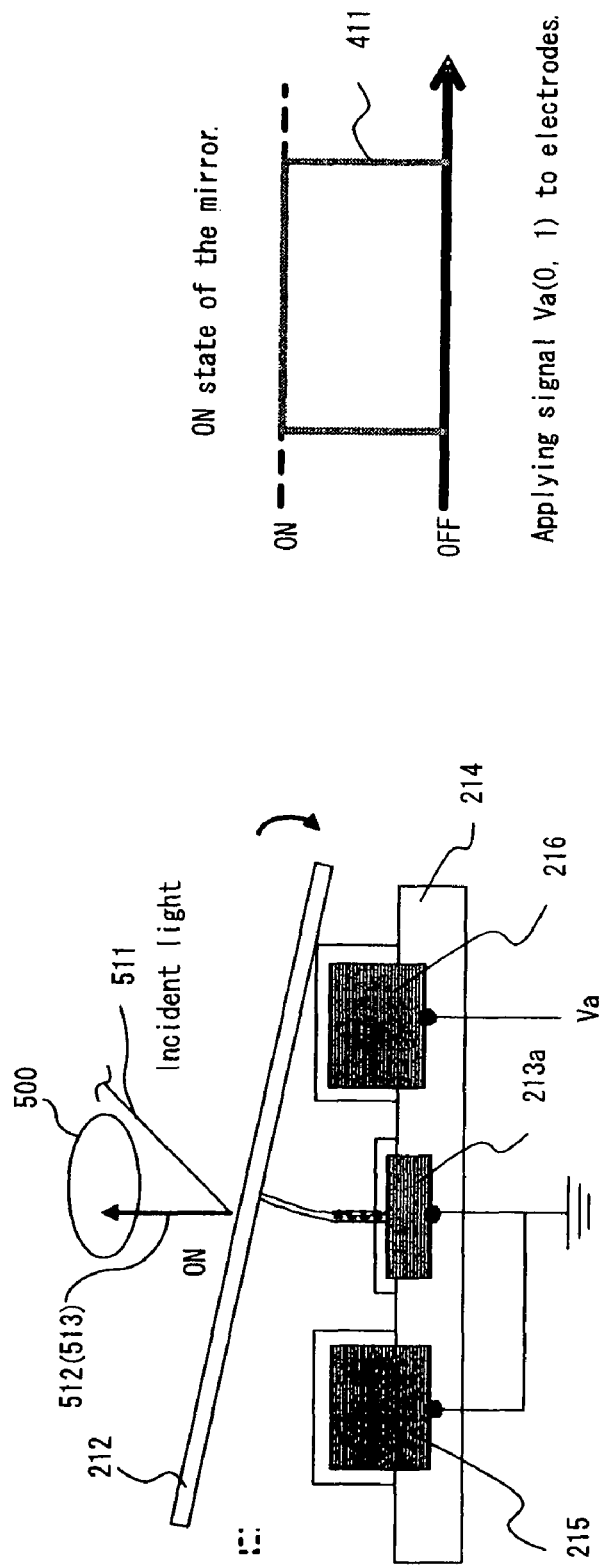

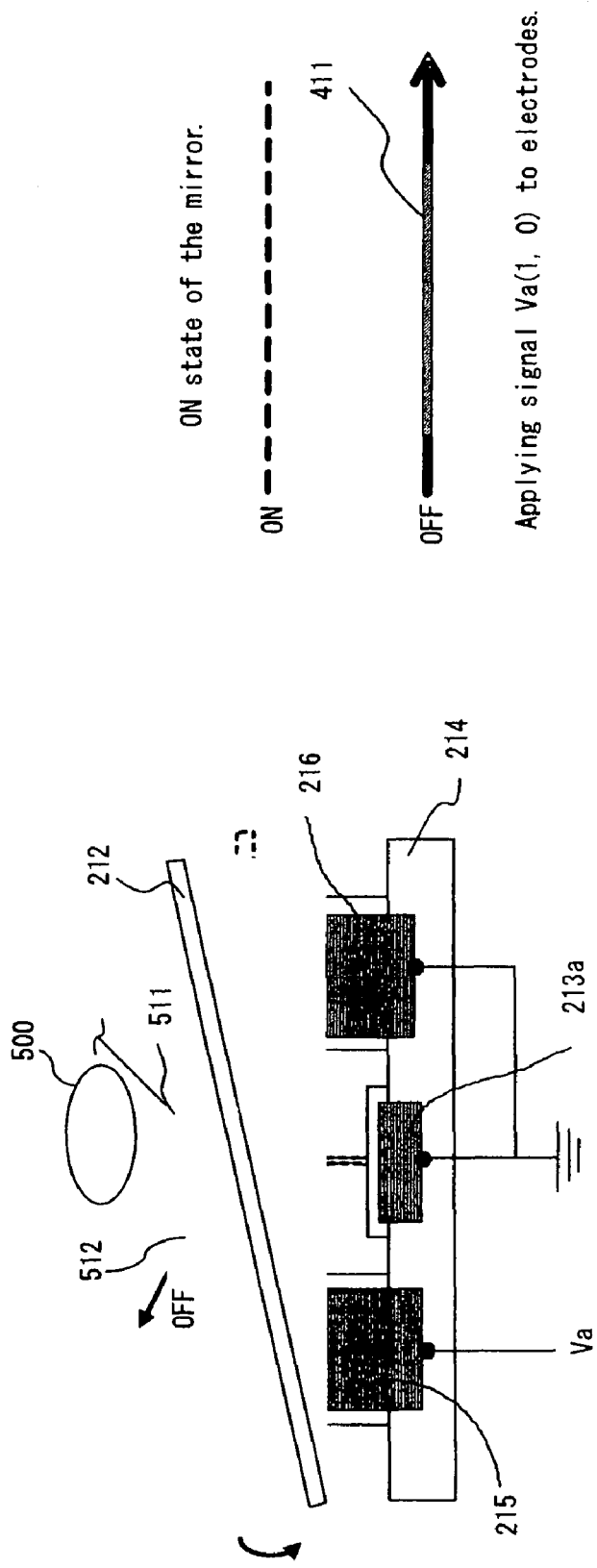

DISPLAY SYSTEM COMPRISING A MIRROR DEVICE WITH MICROMIRRORS CONTROLLED TO OPERATE IN INTERMEDIATE OSCILLATING STATE

This application is a Non-provisional Application claiming a Priority date of Mar. 2, 2007 based on a previously filed Provisional Application 60/904,565 filed by the common Applicants of this application and the disclosures made in Provisional Application 60/904,565 are further incorporated by reference.

BACKGROUND OF THE INVENTION

1. Field of Invention

The present invention relates to an image display system. Particularly, the present invention relates to a display system with spatial light modulator(s) including micromirrors controlled to operate with an intermediate oscillating state.

2. Prior Art

As disclosed by the U.S. Pat. No. 5,287,096 the technique by applying the pulse width modulation (PWM) control according to the digital picture data for controlling the micromirrors of a digital mirror device (DMD) for displaying a projected picture is well known in the art. The optical modulation is carried out depending on the digital picture data by balancing the incoming light from a light source to each micromirror between two states. These two states are the ON state when the incoming light is reflected toward a projective optical system and an OFF state when the incoming light deviates from the projective optical system. The luminance of each pixel of a projected picture depends on the total length of time in which each micromirror stays in the ON state in each frame period of the picture. Therefore, there is a technological challenge to process increase amount of digital picture data in one frame period, and a higher mirror speed for modulating and controlling the mirror into the ON state in order to represent images with higher number of gray scales.

Therefore, to present images with higher number of gray scales without increasing the speed of modulation-controlling a micromirror into the ON state, it is necessary to increase or decrease the quantity of light of a light source in addition to the modulation-control by balancing the micromirror in the DMD as disclosed U.S. Pat. No. 5,589,852, thereby complicating the controlling operation.

For these reasons, even though there are significant advances made in recent years on the technologies of implementing electromechanical micromirror devices as spatial light modulator, there are still limitations and difficulties when the image display system implements the electromechanical micromirrors as spatial light modulator to provide high quality images display. Specifically, when the micromirrors are implemented as the spatial light modulator for a color sequential display system to project the display images, the images have an undesirable "rainbow" effect.

Particularly, the rainbow effects become even more pronounced in the display system based on the HDTV format. The HDTV display format becomes popular while the image size for display on a screen becomes ever bigger such as exceeding 100" in diagonal size. The pixel size on the screen is more than 1 mm when specification is that 100"-size image includes 1920×1080 pixels. Similarly for image displayed on a screen of 50"diagonal-size according to the XGA format, the pixel size is also 1 mm. For such larger size of display pixels, an observer can see each of the pixels on the screen. For these reasons, the display systems require a high number of gray scales of more than 10 bit or 16 bit in order to eliminate the rainbow effect to provide a high quality display system. Furthermore, when the display images are digitally controlled, the image qualities are adversely affected due to the fact that the image is not displayed with sufficient number of gray scales.

Electromechanical micromirror devices have drawn considerable interest because of their application as spatial light modulators (SLMs) that can be conveniently digitally controlled. A spatial light modulator requires an array of a relatively large number of micromirror devices. In general, the number of devices required ranges from 60,000 to several millions for each SLM. Referring to FIG. 1A for a digital video system 1 disclosed in a reference U.S. Pat. No. 5,214,420 that includes a display screen 2. A light source 10 is used to generate light energy as an illumination light source for displaying an image on a display screen 2. The light 9 projected from the light source is further focused and directed toward a lens 12 by a mirror 11. Lenses 12, 13 and 14 function as a beam columnator to columnate the light 9 into a column of light 8. A spatial light modulator 15 is controlled by a computer through data transmitted over a data cable 18 to selectively redirect a portion of the light from a path 7 toward a lens 5 to displaying on a screen 2. The SLM 15 has a surface 16 that includes an array of switchable reflective elements, e.g., micromirror devices 32, such as elements 17, 27, 37, and 47 as reflective elements attached to a hinge 30 shown in FIG. 1B. When element 17 is in one position, a portion of the light from the path 7 is redirected along a path 6 to lens 5 where it is enlarged or spread along a path 4 to impinge on the display screen 2 so as to form an illuminated pixel 3. When element 17 is in another position, the light directed away from the display screen 2 and hence pixel 3 is dark.

The on- and off-states of micromirror control scheme as implemented in the U.S. Pat. No. 5,214,420 and by most of the conventional display system impose a limitation on the quality of the display. Specifically, an application a conventional configuration of a control circuit is faced with a limitation that the gray scale of conventional system with the micromirrors controlled by applying a pulse-width modulation (PWM) between an ON and OFF states, is limited by the minimum controllable amount of incremental illumination determined by the LSB (least significant bit, or the least pulse width). Due to the On-Off states implemented in the conventional systems, there is no way to provide shorter pulse width than LSB. The least amount of incremental brightness controllable by the spatial light modulator determines the resolution of the gray scale and that in turn is determined by the light reflected during the length of time controlled by the least pulse width. The limited gray scales lead to degradations of image display.

Specifically, FIG. 1C shows an exemplary circuit diagram of a prior art control circuit for a micromirror according to a U.S. Pat. No. 5,285,407. The control circuit includes memory cell 32. Various transistors are referred to as "M*" where "*" denotes a transistor number and each transistor is an insulated gate field effect transistor. Transistors M5 and M7 are p-channel transistors; and transistors, M6, M8, and M9 are n-channel transistors. The capacitances C1 and C2 represent the capacitive loads presented to memory cell 32. Memory cell 32 includes an access switch transistor M9 and a latch 32a, which is the basis of a static random access switch memory (SRAM) design. Each of the access transistors M9 in a row receives a DATA signal from a different bit-line 31a. Turning on a row select transistor M9 by using the ROW signal applied to a wordline enables an operation for writing data to the memory cell 32. Latch 32a is formed from two cross-coupled inverters, M5/M6 and M7/M8, which permit two stable states. State 1 is Node A high and Node B low and state 2 is Node A low and Node B high. The dual state switching operations are carried out by the control circuit to control the micromirrors to move to a position either at an ON or OFF angular orientation as shown in FIG. 1A. The brightness, i.e., the gray scales of display for a digitally controlled image system is determined by the length of time the micromirror stays at an ON position. The length of time a micromirror is controlled at an ON position is in turn controlled by a multiple-bit word. For simplicity of illustration, FIG. 1D shows the "binary time intervals" when controlled by a four-bit word. As shown in FIG. 1D, the time durations have relative values of 1, 2, 4 and 8 that in turn define the relative brightness for each of the four bits where the "1" is for the least significant bit and the "8" is for the most significant bit. In accordance with the control mechanism as shown, the minimum controllable difference between gray scales for showing different brightness is a brightness represented by a "least significant bit" that maintains the micromirror at an ON position.

When adjacent image pixels are displayed with a great degree of different gray scales due to a very coarse scale of controllable gray scale, artifacts are shown between these adjacent image pixels. That leads to image degradations. The image degradations are specially pronounced in bright areas of display when there are "bigger gaps" of gray scales between adjacent image pixels. It was observed in an image of a female model that there were artifacts shown on the forehead, the sides of the nose and the upper arm. The artifacts are generated by a technical limitation that the digitally controlled display does not provide a sufficient number of gray scales. At the bright spots of display, e.g., the forehead, the sides of the nose and the upper arm, the adjacent pixels are displayed with visible gaps of light intensities.

As the micromirrors are controlled to have a fully ON and fully OFF positions, the light intensity is determined by the length of time the micromirror is at the fully ON position. In order to increase the number of gray scales of display, the speed of the micromirror must be increased to the extent that the digitally controlled signals can be increased to a higher number of bits. However, when the speed of the micromirrors is increased, a stronger hinge is necessary for the micromirror to sustain a required number of operational cycles for a designated lifetime of operation. In order to drive the micromirrors supported on a further strengthened hinge, a higher voltage is required. The higher voltage may exceed twenty volts and may even be as high as thirty volts. The micromirrors manufactured by applying the CMOS technologies probably is not suitable for operation at such higher range of voltages and therefore the DMOS micromirror devices may be required. In order to achieve higher degree of gray scale control, a more complicated manufacturing process and larger device areas are necessary when DMOS micromirror is implemented. Conventional modes of micromirror control are therefore faced with a technical challenge that the gray scale accuracy must be sacrificed for the benefits of smaller and more cost effective micromirror display due to the operational voltage limitations.

There are many patents related to a light intensity control. These patents include the U.S. Pat. Nos. 5,589,852, 6,232, 963, 6,592,227, 6,648,476, and 6,819,064. There are further patents and patent applications related to different shapes of light sources. These patents include the U.S. Pat. Nos. 5,442, 414, 6,036,318 and Application 20030147052. The U.S. Pat. No. 6,746,123 discloses special polarized light sources for preventing a light loss. However, these patents or patent application do not provide an effective solution to overcome the limitations caused by insufficient gray scales in the digitally controlled image display systems.

There are several patents related to display systems that apply non-binary data for image control. These patents include the U.S. Pat. Nos. 5,315,540, 5,619,228, 5,969,710, 6,052,112, 6,970,148, and US Patent Application US 2005/0190429. Furthermore, there are many patents related to a spatial light modulation that includes the U.S. Pat. Nos. 2,025,143, 2,682,010, 2,681,423, 4,087,810, 4,292,732, 4,405,209, 4,454,541, 4,592,628, 4,615,595, 4,728,185, 4,767,192, 4,842,396, 4,907,862, 5,214,420, 5,287,096, 5,506,597, 5,489,952, 5,827,096, 6,064,366, 6,535,319, 6,719,427, 6,880,936, and 6,999,224. However, these inventions do not address or provide direct resolutions for a person of ordinary skills in the art to overcome the above-discussed limitations and difficulties.

Therefore, a need still exists in the art of image display systems applying digital control of a micromirror array as a spatial light modulator to provide new and improved systems such that the above-discussed difficulties can be resolved.

SUMMARY OF THE INVENTION

An advantage of the present invention is to realize more delicate gray scale in the picture display using a spatial light modulation element to display a picture depending on the modulation state of a plurality of micromirrors without increasing the speed of modulation-controlling the micromirrors into the ON state.

Another advantage of the present invention is to realize more delicate gray scale in the picture display using a spatial light modulation element to display a picture depending on the modulation state of a plurality of micromirrors without complicated control of the quantity of light of a light source or an additional circuit.

The present invention provides a displaying technique of controlling the intermediate oscillation having amplitude smaller than the maximum amplitude of a micromirror in the spatial light modulation element in an optional time duration or frequency.

The first aspect of the present invention is a display system including:

a light source; a spatial light modulation element having a plurality of micromirrors and forming a picture to be displayed from the light from the light source by modulating the plurality of micromirrors; and a control device for controlling the spatial light modulation element. with the configuration, the control device includes a modulation-control device for generating a modulation control signal for the plurality of micromirrors depending on the digital picture data input to the display system, and controlling the spatial light modulation element; the modulation state of the micromirrors by the modulation control signal includes the modulation by the oscillation of the micromirrors; the modulation control signal controls the amplitude of the oscillation to be equal to or smaller than the maximum amplitude of the micromirrors in the modulation by the oscillation of the micromirrors; and the oscillation having equal or smaller amplitude than the maximum amplitude of the micromirrors is repeated by the modulation control signal in a time duration or a number of times so as to generate a modulated light having desired intensity.

The second aspect of the present invention is based on the display system according to the first aspect. The control device includes a data conversion device for converting a part or all of the digital picture data input to the display system into non-binary data; and the modulation-control device generates a modulation control signal of the micromirrors depending on the non-binary data, and controls the spatial light modulation element.

The third aspect of the present invention is based on the display system according to the first aspect. In the display system, the oscillation having equal or smaller amplitude than the maximum amplitude of the micromirrors includes free oscillation, which decreases its amplitude with time.

The fourth aspect of the present invention is based on the display system according to the first aspect. In the display system, an optional time in which the modulation by the oscillation is longer than one oscillation period of the micromirrors.

The fifth aspect of the present invention is based on the display system according to the first aspect. In the display system, the modulation by the oscillation of the micromirrors is performed at least once in one frame period of the digital image data.

The sixth aspect of the present invention is based on the display system according to the first aspect. In the display system, the number of times at which the oscillation of the micromirrors is repeated is two times or more in one frame period of the digital picture data.

The seventh aspect of the present invention is based on the display system according to the first aspect. In the display system, the spatial light modulation element includes a driving electrode for controlling the micromirrors, and the micromirrors are controlled by the voltage applied to the driving electrode or said micromirrors.

The eighth aspect of the present invention is based on the display system according to the first aspect. In the display system, the spatial light modulator comprises a driving electrode controlling the micromirrors, and the modulation control signal is a digital control signal for providing a 1-bit control signal for at least one driving electrode or said micromirrors for controlling the micromirrors.

The ninth aspect of the present invention is based on the display system according to the first aspect. In the display system, the spatial light modulator comprises a driving electrode controlling the micromirrors, and the modulation control signal applying at least three voltages to at least one driving electrode or said micromirrors for controlling the micromirrors.

The tenth aspect of the present invention is based on the display system according to the first aspect. In the display system, the modulation-control device generates a modulation signal to perform modulation by the oscillation of the micromirrors based on at least 1-bit data other than a most significant bit (MSB) in a plurality of bits forming the digital picture data input to the display system.

The eleventh aspect of the present invention is a control method of a display system. The method includes:
a step of converting a part or all of input binary digital picture data into non-binary data; a step of determining a time duration of the modulation by the oscillation of micromirrors based on the non-binary data, so as to generate a modulated light having desired intensity; and a step of modulation-controlling the micromirrors wherein a control device controls amplitude of the oscillation to have equal to or less than the maximum amplitude of the micromirrors.

The twelfth aspect of the present invention is based on the control method according to the eleventh aspect. In the control method, the modulation by oscillation of the micromirrors is performed at least once in one frame period of the digital image data.

The thirteenth aspect of the present invention is based on the control method according to the eleventh aspect. In the control method, the number of times is two times or more in one frame period of the digital image data.

The fourteenth aspect of the present invention is a display system including:
a spatial light modulation element for projecting a picture to be displayed using the modulation depending on an ON state, an OFF state, and an oscillating state of a plurality of micromirrors; and a control device for controlling the spatial light modulation element. with the configuration, the luminance of a projected picture obtained by the modulation by the oscillating state of the micromirrors controlled in an optional control period T by a control signal from the control device is 1/n of the luminance Lon of the projected picture obtained by the modulation by the ON state of the micromirrors controlled by the control period T; the luminance Losc of the projected picture obtained by the modulation by the oscillating state of the micromirrors in one frame period of a picture is calculated by the following equation $$Losc = Lon \times (1/n) \times (Tosc/T)$$

with respect to time Tosc in which the oscillation is performed by the oscillating state; and 1/n is smaller than 0.75.

The fifteenth aspect of the present invention is based on the display system according to the fourteenth aspect. In the display system, the modulation by the oscillation of the micromirrors is performed to set the amplitude of the oscillation equal or smaller than the maximum amplitude of the micromirrors.

The sixteenth aspect of the present invention is based on the display system according to the fourteenth aspect. In the display system, the value of 1/n is between appropriately 0.2 and appropriately 0.5.

The seventeenth aspect of the present invention is based on the display system according to the fourteenth aspect. In the display system, the value of 1/n is substantially smaller than 0.2.

The eighteenth aspect of the present invention is a display system including:
a spatial light modulation element for projecting a picture to be displayed using the modulation depending on an ON state, an OFF state, and an oscillating state of a plurality of micromirrors; and a control device for controlling the spatial light modulation element. with the configuration, the luminance of a projected picture obtained by an oscillation modulation of the micromirrors controlled in a time duration of an oscillation period T of the micromirrors by a control signal from the control device is 1/n of the luminance Lon of the projected picture obtained by the modulation by the ON state of the micromirrors controlled by the control period T; the luminance Losc of the projected picture obtained by the modulation by the oscillating state of the micromirrors in one frame period of a picture is calculated by the following equation $$Losc = Lon \times (1/n) \times m$$

with respect to a frequency m at which the oscillation of the micromirrors is performed; and 1/n is smaller than 0.75.

The nineteenth aspect of the present invention is based on the display system according to the eighteenth aspect. In the display system, the modulation by the oscillation of the micromirrors is performed to set the amplitude of the oscillation equal or smaller than the maximum amplitude of the micromirrors.

The twentieth aspect of the present invention is based on the display system according to the eighteenth aspect. In the display system, the value of 1/n is between appropriately 0.2 and appropriately 0.5.

The twenty-first aspect of the present invention is based on the display system according to the eighteenth aspect. In the display system, the value of 1/n is substantially larger than 0.2.

The twenty-second aspect of the present invention is a display system including: a spatial light modulation element for projecting a picture to be displayed by the modulation state of a plurality of micromirrors; and a control device for controlling the spatial light modulation element. with the configuration, the control device includes: a data conversion device for converting a part or all of the digital picture data input to the display system into non-binary data; and the modulation-control device for generating a modulation control signal of the micromirrors depending on the non-binary data, and controlling the spatial light modulation element, and the modulation state of the micromirrors by the modulation control signal includes at least two modulations by the oscillation of the micromirrors; the modulation control signal controls at least two modulation by the oscillation of the micromirrors includes a modulation by a first oscillation having an amplitude equal or smaller than a maximum amplitude of the micromirrors, and a modulation by a second oscillation having an amplitude smaller than the first oscillation of the amplitude; and each of the first oscillation and the second oscillation is repeated in a time duration or a number of times so as to generate a modulated light having desired intensity.

The twenty-third aspect of the present invention is based on the display system according to the twenty-second aspect. In the display system, the time duration in which each of said first oscillation and said second oscillation is repeated is longer than one oscillation period of the micromirrors.

The twenty-fourth aspect of the present invention is based on the display system according to the twenty-second aspect. In the display system, the number of times at which each of the first oscillation and the second oscillation is two times or more in one frame period of the digital image data.

The twenty-fifth aspect of the present invention is based on the display system according to the twenty-second aspect. In the display system, the modulation-control device increases the levels of the gray scale of a digital image by combining the modulation by the first oscillation and the modulation by the second oscillation.

BRIEF DESCRIPTIONS OF DRAWINGS

FIG. 1A shows a prior art illustrating the basic principle of a projection display using a micromirror device;

FIG. 1B shows a prior art illustrating the basic principle of a micromirror device used for a projection display;

FIG. 9A is an explanatory view showing the ON state of the micromirrors;

FIG. 9B is a diagram showing the voltage waveform for realizing the ON state of the micromirrors;

FIG. 10A is an explanatory view showing the OFF state of the micromirrors;

FIG. 10B is a diagram showing the voltage waveform for realizing the OFF state of the micromirrors;

Figure 17:
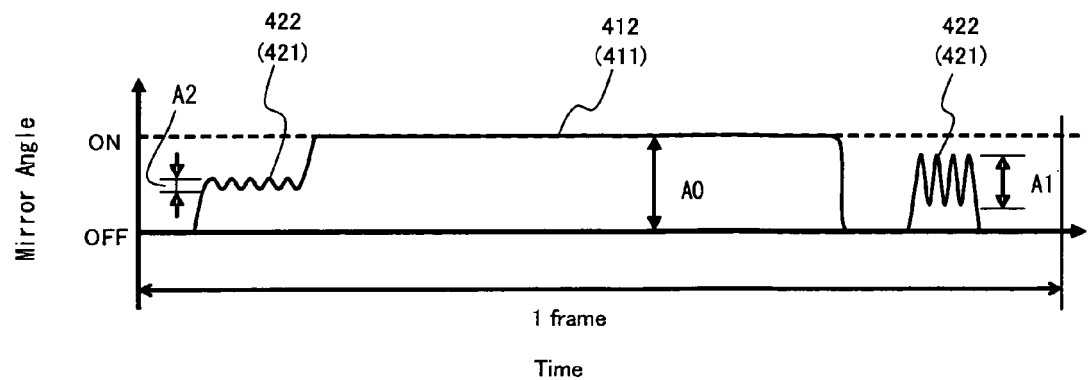
Figure 18:
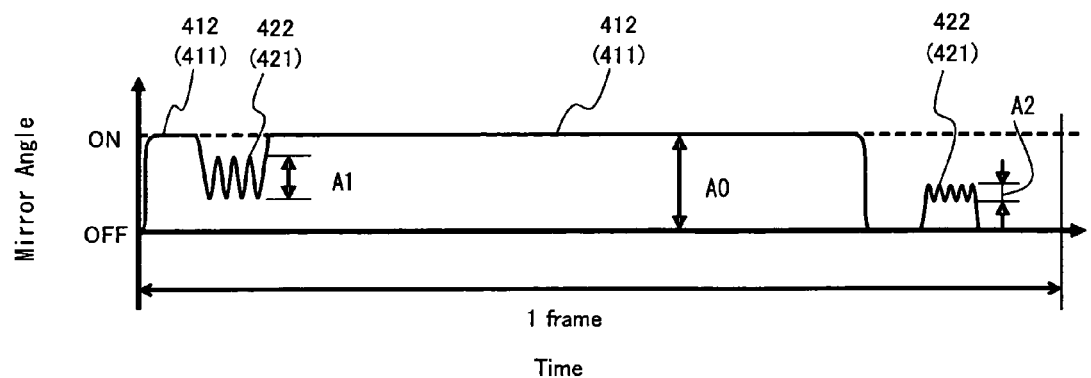

FIG. 17 is a diagram illustrating the improved gray scale by a combination of the ON state of the micromirrors and the oscillating state by the display system according to an embodiment of the present invention; and FIG. 18 is a diagram illustrating the improved gray scale by a combination of the ON state of the micromirrors and the oscillating state by the display system according to an embodiment of the present invention.

DESCRIPTION OF THE PREFERRED EMBODIMENTS

The embodiments of the present invention are described below in detail with reference to the attached drawings.

Figure 1C:
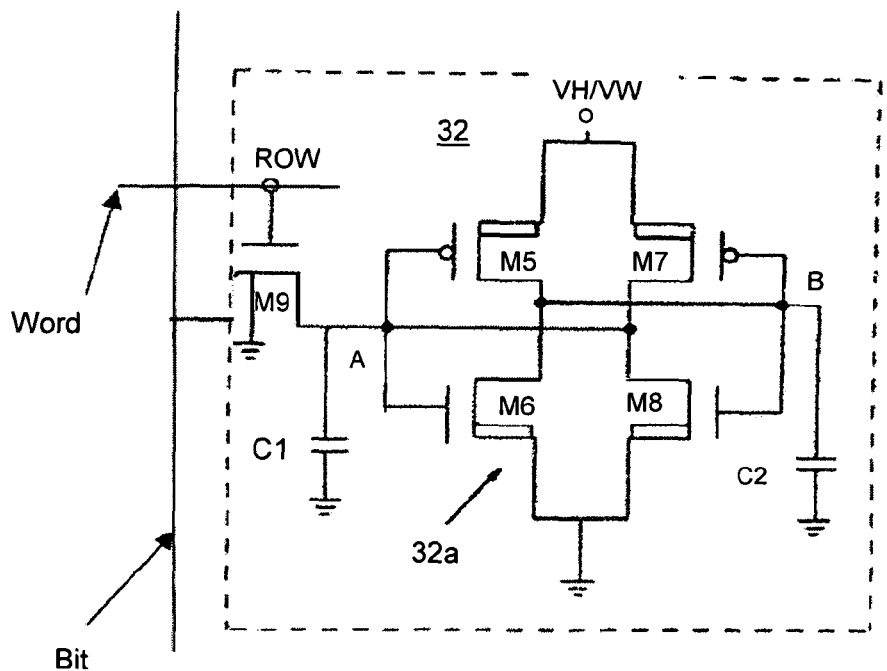
FIG. 1C shows an example of the driving circuit of prior arts.
Figure 1D:
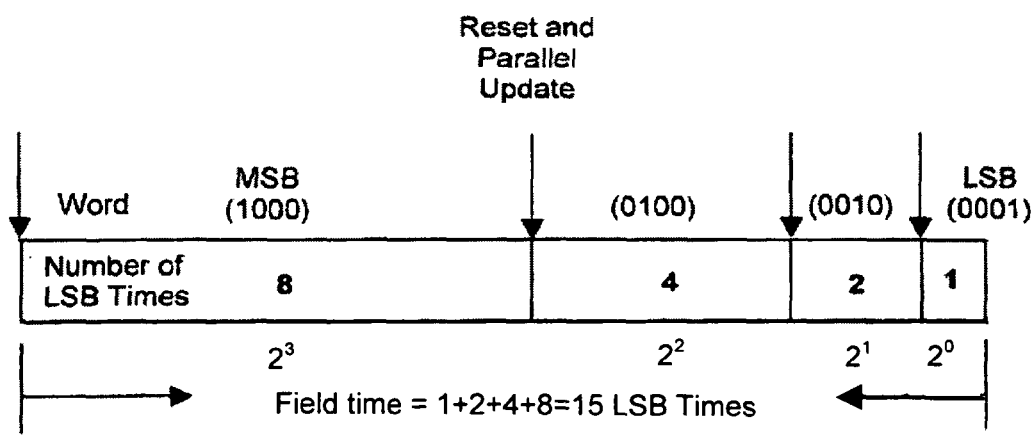
FIG. 1D shows the scheme of binary pulse width modulation (binary PWM) of conventional digital micromirrors to generate gray scale.
Figure 2:
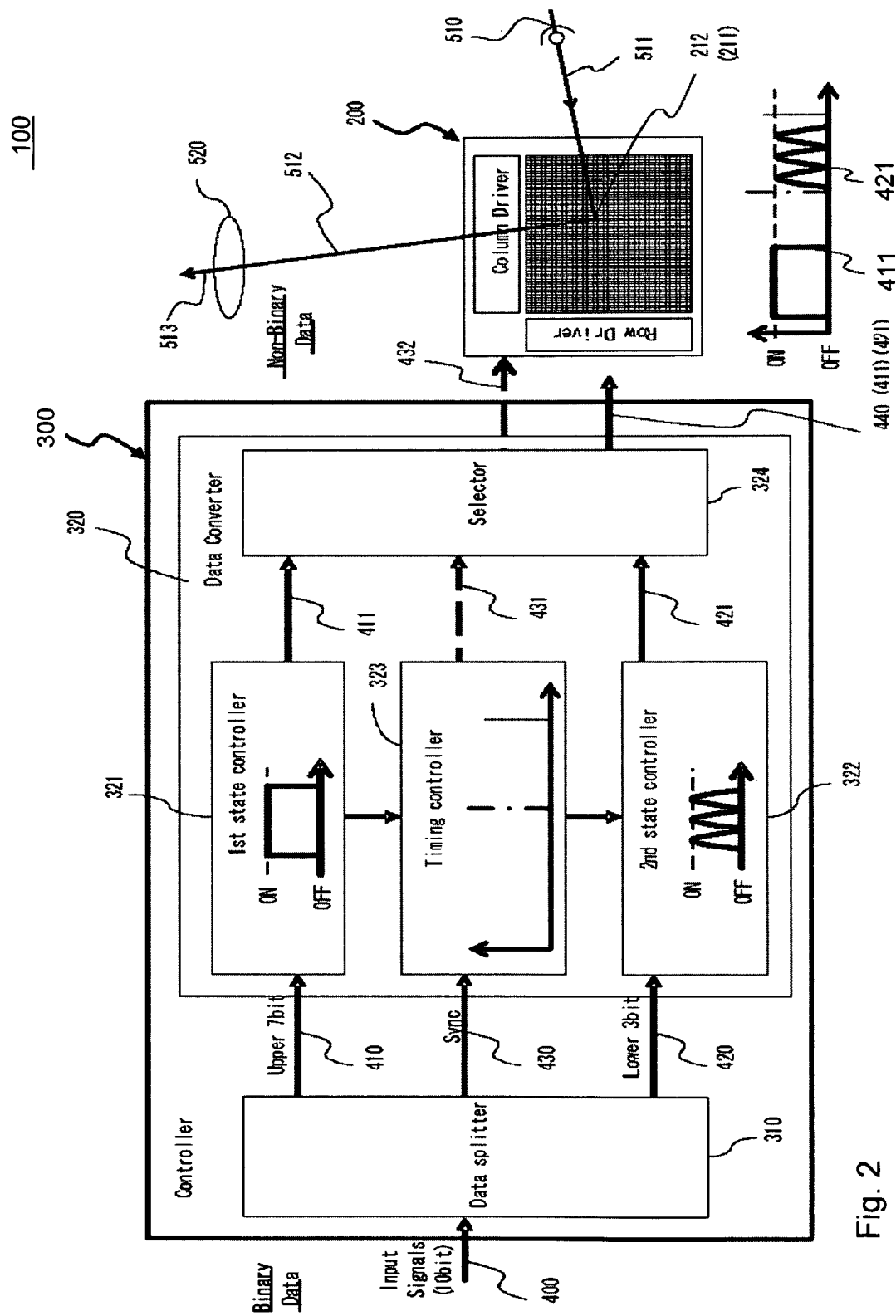
FIG. 2 shows a functional block diagram to illustrate the concept and configuration of the display system according to an embodiment of the present invention.
Figure 3:
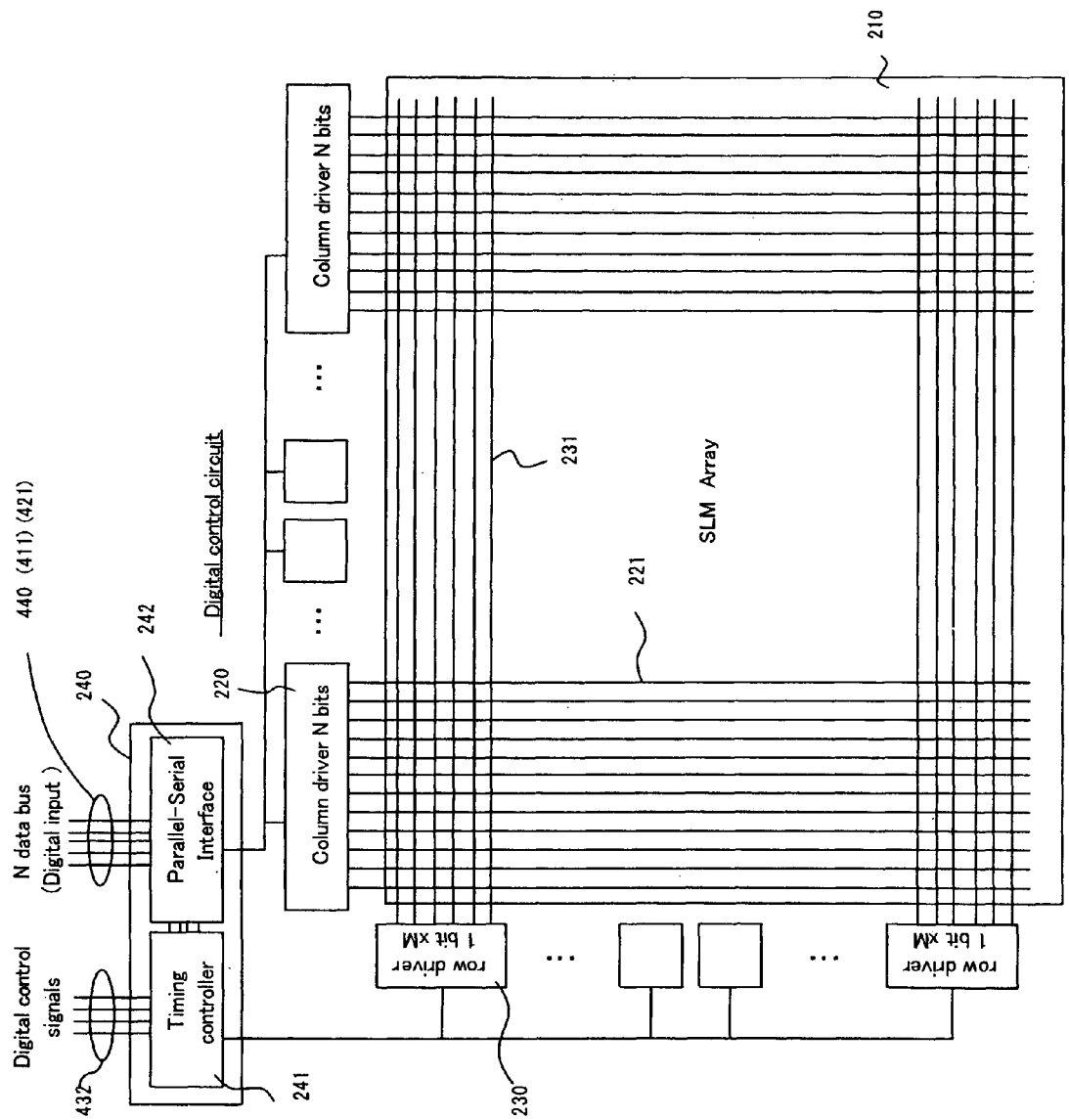
FIG. 3 is a block diagram for showing an exemplary configuration of the spatial light modulation element forming the display system according to an embodiment of the present invention.
Figure 4A:
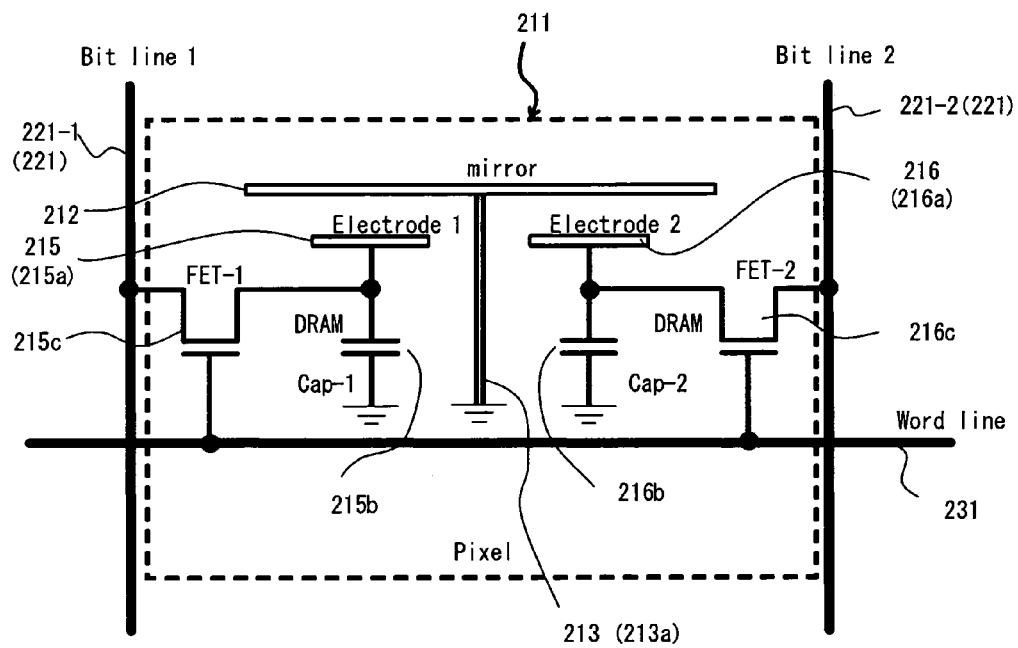
FIG. 4A is cross sectional view of a pixel unit as an exemplary configuration for forming the spatial light modulation element according to an embodiment of the present invention.
Figure 4B:
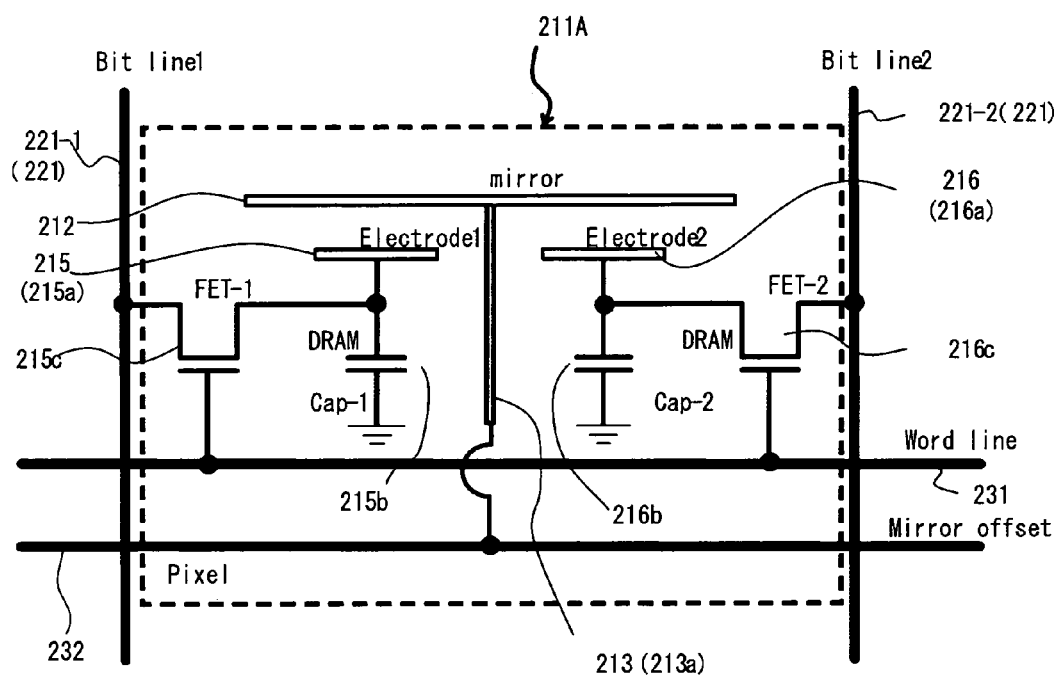
FIG. 4B shows the concept of an example of a variation of the pixel unit forming the spatial light modulation element according to an embodiment of the present invention.

FIG. 2 shows an exemplary configuration of the display system according to an embodiment of the present invention. FIG. 3 is a block diagram showing an example of the configuration of the spatial light modulation element forming the display system according to an embodiment of the present invention. FIGS. 4A and 4B are cross sectional views of exemplary configuration of a pixel unit 211 forming the spatial light modulation element according to an embodiment of the present invention.

A display system 100 according to the embodiments of the present invention includes a spatial light modulation element 200, a control device 300, a light source 510, and a projective optical system 520.

Figures 11A, 11B:
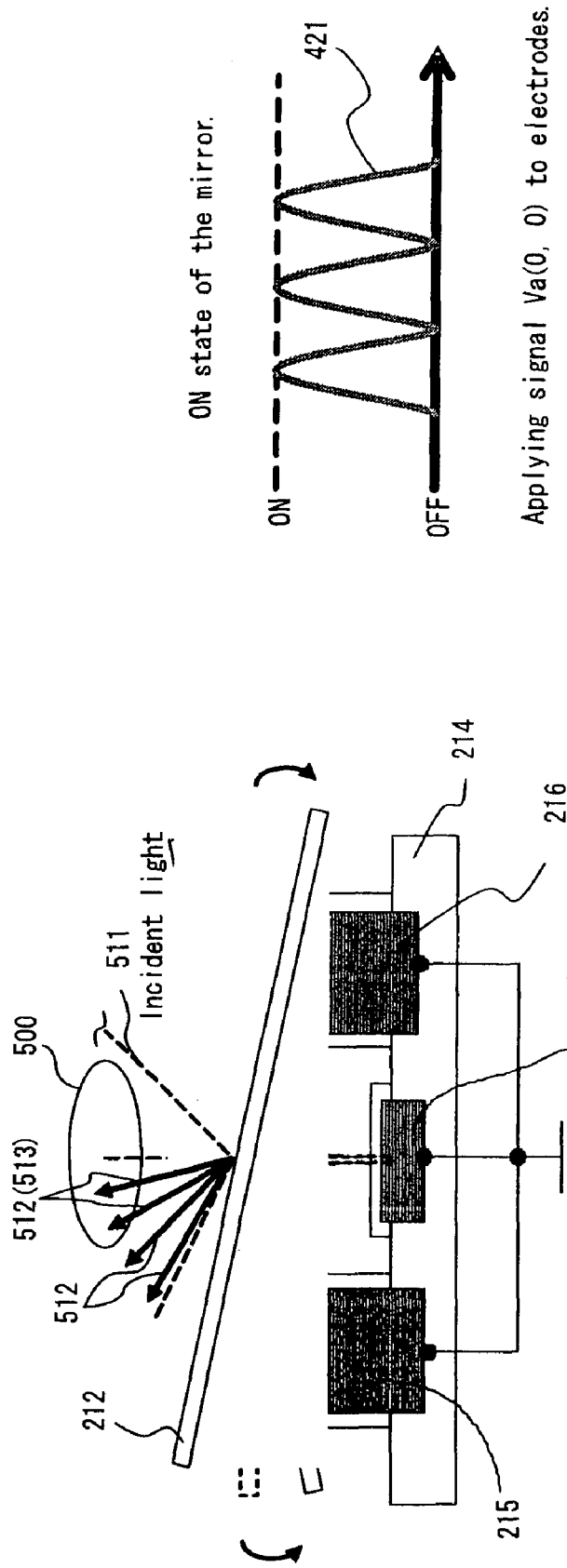
FIG. 11A is an explanatory view showing the oscillating state of the micromirrors.
FIG. 11B is a diagram showing the voltage waveform for realizing the oscillating state of the micromirrors.

As shown in FIGS. 3 and 4, the spatial light modulation element 200 includes a pixel array 210, a column driver 220, a row driver 230, and an external interface unit 240. In the pixel array 210, a plurality of pixel units 211 are arranged in grid form at each intersection of a bit line 221 vertically extending from the column driver 220 and a word line 231 horizontally extending from the row driver 230. As illustrated in FIGS. 9A, 10A, and 11A, each pixel unit 211 is manufactured with a micromirror 212 supported on a substrate 214 to flexibly tilt to different angles with a flexibly deflectable hinge 213. An OFF electrode 215 and an OFF stopper 215a, and an ON electrode 216 and an ON stopper 216a are supported on the substrate 214 and symmetrically arranged relative to the hinge 213 with a hinge electrode 213a disposed nearby. The OFF electrode 215 pulls the micromirror 212 with a Coulomb force by applying predetermined electrical voltage to deflect the micromirror 212 until it touches the OFF stopper 215a. Thus, the incident light 511 projected to the micromirror 212 is reflected toward the optical path in the OFF position deviated from the optical axis of a projective optical system. The ON electrode 216 pulls the micromirror 212 with the Coulomb force by applying predetermined electrical voltage to deflect the micromirror 212 until it touches the ON stopper 216a. Thus, the incident light 511 projected to the micromirror 212 is reflected toward the optical path along the ON direction matching the optical axis for displaying the images.

An OFF capacitor 215b is connected to the OFF electrode 215, and the OFF capacitor 215b is connected to a bit line 221-1 through a gate transistor 215c. An ON capacitor 216b is connected to the ON electrode 216. The ON capacitor 216b is connected to the bit line 221-2 through a gate transistor 216c. The word line 231 controls the opening and closing operations of the gate transistor 215c and the gate transistor 216c. Specifically, a horizontal row of the pixel unit 211 connected to any of the word lines 231 is simultaneously selected, and the charge/discharge of electric charge with respect to the OFF capacitor 215b and the ON capacitor 216b is controlled by the bit line 221-1. The bit line 221-2, thereby individually controls the ON/OFF of the micromirror 212 in each pixel unit 211 in the horizontal row.

FIG. 4B shows an alternate embodiment of the pixel unit as that illustrated in FIG. 4A. The hinge 213 (hinge electrode 213a) supports the micromirror 212 is connected to a mirror potential control line 232 in the pixel unit 211A as an alternate embodiment shown in FIG. 4B. The electrical voltage applied to the micromirror 212 can be externally controlled, which is different from the configuration shown in FIG. 4A. Therefore, in the pixel unit 211A as an alternate configuration shown in FIG. 4B, has different methods of mirror control. By controlling the combination of the voltage applied from the bit line 221-1 and the bit line 221-2 to the OFF electrode 215 and the ON electrode 216 and the voltage level and by controlling the application timing of the voltage applied from the mirror potential control line 232 to the micromirror 212, the tilt angle and the tilt speed of the micromirror 212 can be flexibly controlled. For example, the level of the amplitude of the intermediate oscillation between the ON state and the OFF state of the micromirror 212 can be flexibly controlled. This is achieved by maintaining constant timing of applying a voltage to the OFF electrode 215 and the ON electrode 216, and by changing the value of the voltage applied from the mirror potential control line 232 to the 215 and the ON electrode 216, and further to the micromirror 212. can be changed.

FIG. 3 shows an external interface unit 240 that includes a timing controller 241 and a parallel/serial interface 242. The timing controller 241 selects the pixel unit 211 of the horizontal row by the word line 231 based on a scanning timing control signal 432 output from a selector 324. Furthermore, the parallel/serial interface 242 provides a modulation control signal 440 for the column driver 220.

The light source 510 irradiates the spatial light modulation element 200 with incoming light 511. The light is reflected as reflected light 512 by each micromirror 212, and the reflected light 512 in the optical path through the 520 is projected as projected light 513 on the screen (not specifically shown in the attached drawings).

FIG. 2 shows the control device 300 according to the present embodiment for controlling the spatial light modulation element 200 implemented with a data splitter 310 and a data converter 320. As will be further described later, the control device 300 generates and controls the levels of gray scale using the ON/OFF state (ON/OFF modulation) and the oscillating state (oscillation modulation) of the micromirror 212 of the spatial light modulation element 200. The data splitter 310 has the function of separating a binary picture signal 400 of externally input binary data into separated data 410 for control of the micromirror 212 for ON/OFF modulation. The separated data 420 is implemented to control of the micromirror 212 for a modulation state, and also the function of outputting a synchronization signal 430 to control the data converter 320. The data converter 320 includes a first state control unit 321, a second state control unit 322, a timing control unit 323, and a selector 324. The first state control unit 321 has the function of controlling the micromirror 212 for the ON/OFF state by outputting non-binary data 411 to the spatial light modulation element 200 through the selector 324 based on the separated data 410. The second state control unit 322 has the function of controlling the micromirror 212 for the oscillating state by outputting non-binary data 421 to the spatial light modulation element 200 through the selector 324 based on the separated data 420.

The timing control unit 323 calculates the time required to operate the micromirror 212 in the ON state and the time duration required to operate the micromirror 212 in the oscillating state in each frame for forming the binary picture signal 400 with respect to each micromirror 212 configuring a pixel of an image based on the synchronization signal 430 generated by the binary picture signal 400. The synchronization signal 430 controls the first state control unit 321 and the second state control unit 322, and outputs a control signal 431 to the selector 324.

The selector 324 switches the output of the non-binary data 411 or the non-binary data 421 to the spatial light modulation element 200 according to the control signal 431. The control of the micromirror 212 from the ON/OFF modulation by the first state control unit 321 using the non-binary data 411 is switched to the oscillation modulation by the second state control unit 322 applying the non-binary data 421. Or alternately the selector controls a switch from the oscillation modulation to the ON/OFF modulation. The data splitter 310, the first state controller 321, the second state controller 322, the timing control unit 323 and the selector 324 can be implemented with an integrated processor.

The binary data and the non-binary data are implemented for controlling the mirror and described below with reference to FIGS. 5, 6, 7, and 8.

Figure 5:
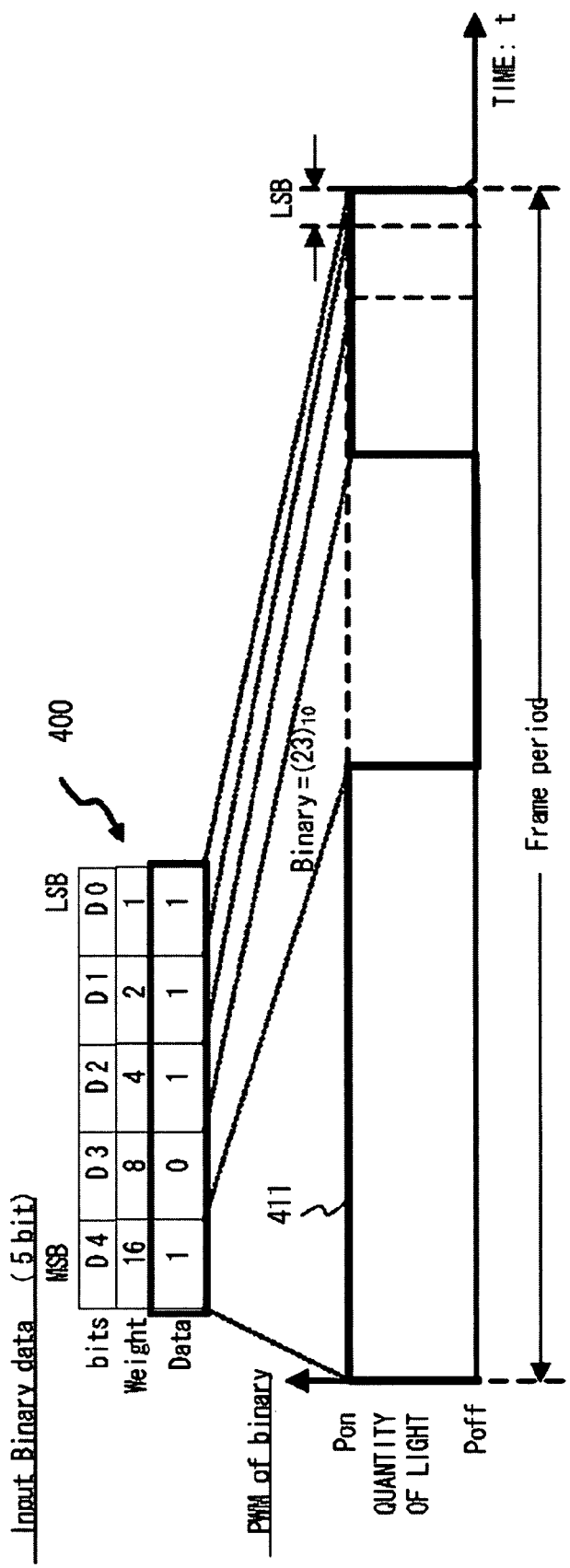
FIG. 5 is a diagram showing an example of the pulse width modulation (PWM) using binary data.

FIG. 5 shows the N bits of the binary data, i.e., the binary picture signal 400, with bits multiplied by different weight factors from the LSB (least significant bit) to the MSB (most significant bit).

When the pulse width modulation (PWM) is implemented to control the gray scale of the image display, the weight of each bit represents a relative time duration of the ON state of each data segment represented as a sub-frame in a display frame.

Figure 6:
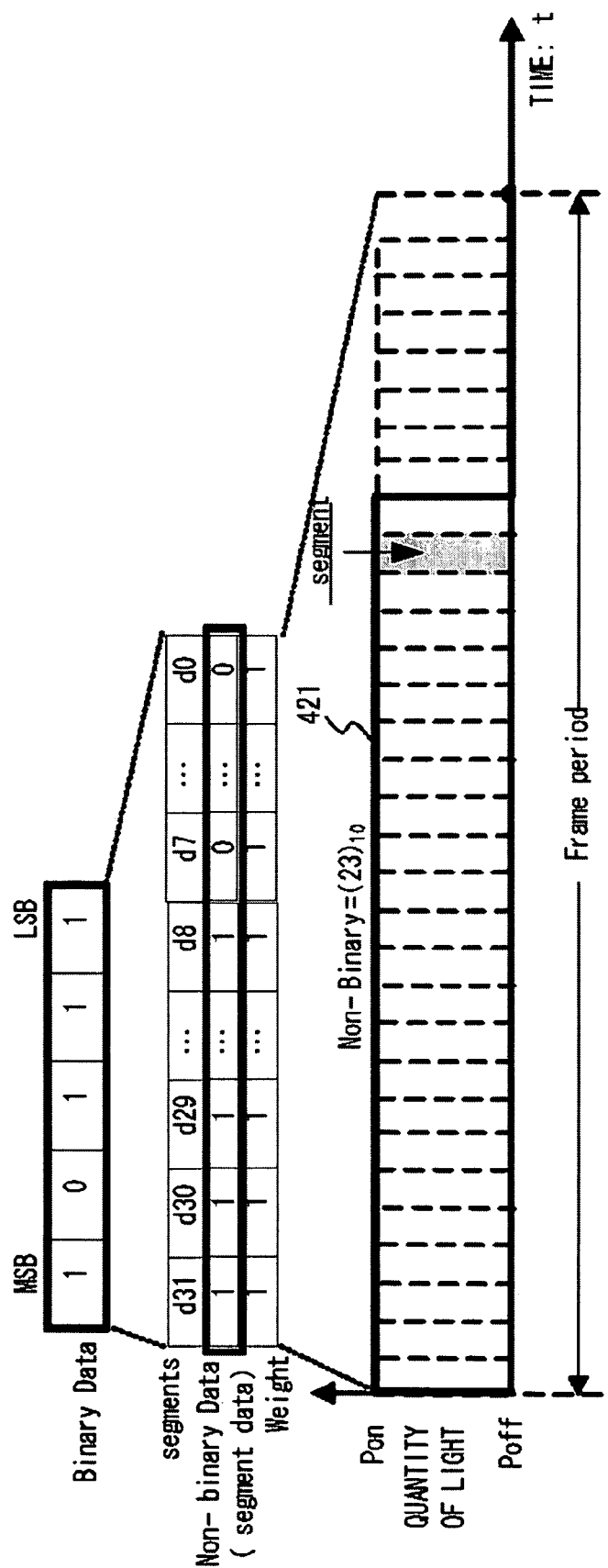
FIG. 6 is a diagram showing an example of converting binary data into non-binary data.

FIG. 6 shows an embodiment by converting all 5 bits of the input binary data into the non-binary data with all the weighting factors set to 1. The time period of a data segment, i.e., the sub-frame, of the binary data of all 5 bits is determined by the weighting factor, i.e., of the LSB. The data is converted into non-binary data as a bit string for each segment, and transferred to the spatial light modulation element 200. The frequency of the ON state according to the interval of the LSB of the binary data is calculated. The gray scale is represented to continue the period of the ON state for the bit string.

Figure 7:
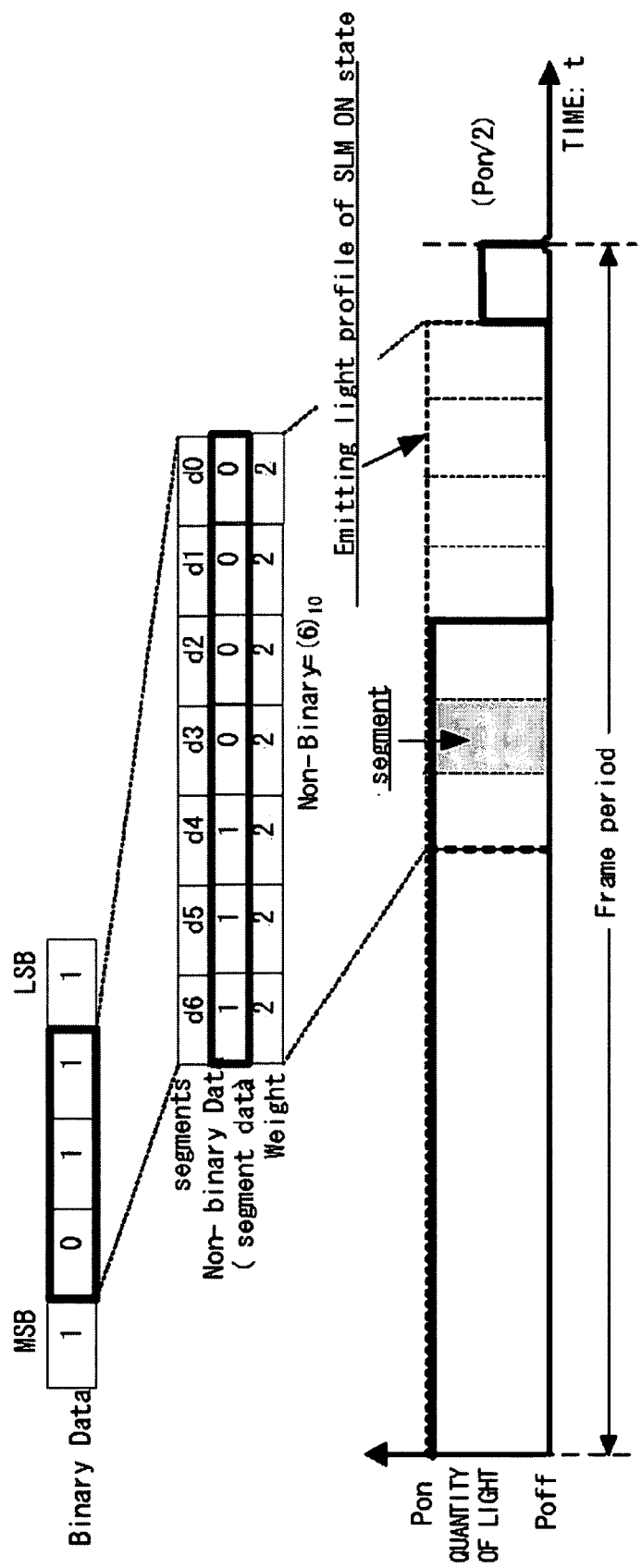
FIG. 7 is a diagram showing an example of converting a part of binary data into non-binary data.
Figure 8:
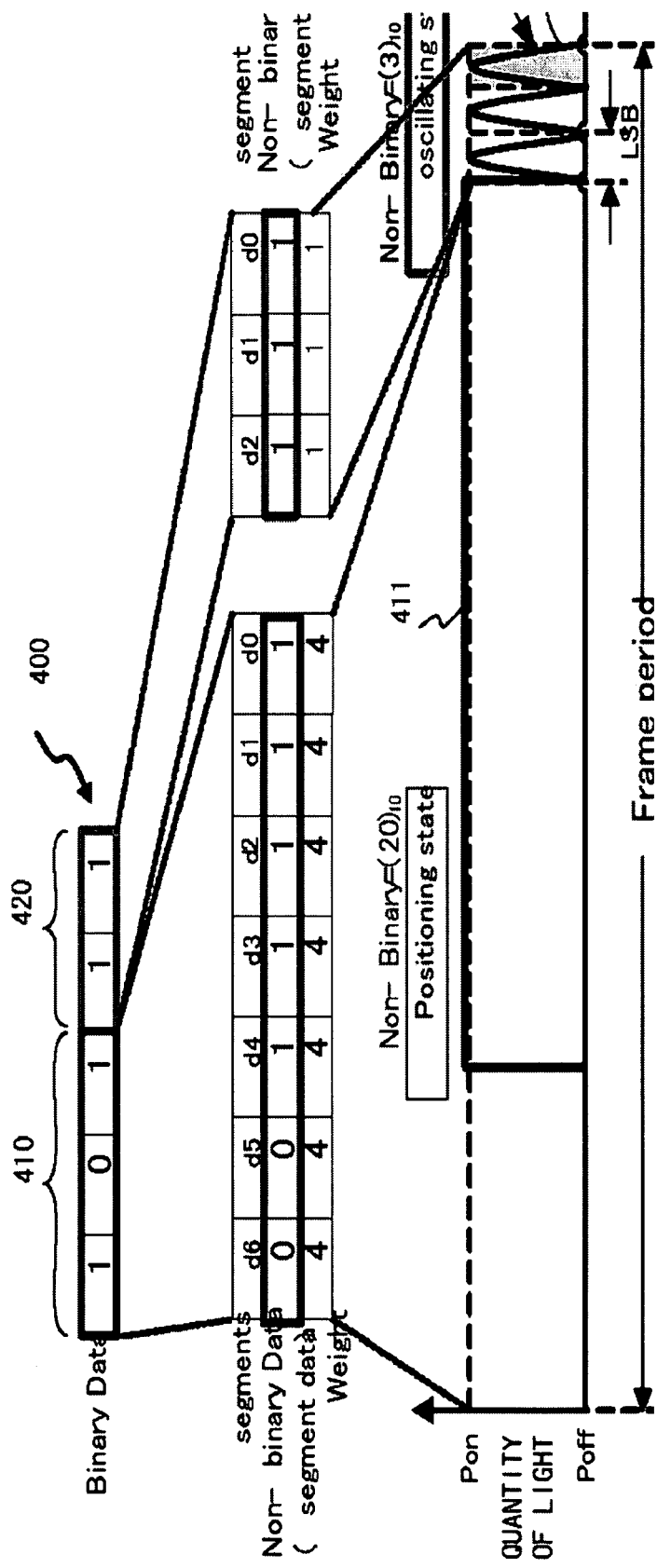
FIG. 8 is a diagram showing an example of converting binary data into non-binary data in a display system a an embodiment of the present invention.

FIG. 7 shows an embodiment by converting three internal bits of the binary data into non-binary data. In this example, the quantity of light is modulated (ratio of the quantity of light=½) on the lowest order bit of the binary data using the spatial light modulation element 200 or the light source 510. In this case, the weighting factors of all bits other than the highest order bit of the binary data is set to 2. The interval of one segment is extended, thereby matching the interval of the segment of the lowest order bit with the intervals of other segments. Each pixel element, i.e., pixel unit 211, of the spatial light modulation element 200 is a micromirror 212 controlled to operate in any of the ON/OFF state, the oscillating state, and the intermediate state. FIG. 8 shows an alternate embodiment by controlling the ON/OFF mirror state with the non-binary data 411 outputted from the first state control unit 321. An oscillating mirror state is controlled by the non-binary data 421 outputted from the second state control unit 322. In this case, the quantity of light is modulated by the spatial light modulation element 200 using the non-binary data 421, thereby extending the interval of for applying the data segment by reducing the time required to carry out an arithmetic operation.

The basic control methods of the micromirror 212 of the spatial light modulation element 200 are described below according to embodiments of the present invention. Special mathematical symbols are employed in the following descriptions. Namely, Va (1, 0) indicates a predetermined voltage Va is applied to the OFF electrode 215, and not applied to the ON electrode 216. Va (0, 1) indicates that no voltage is applied to the OFF electrode 215, and the voltage Va is applied to the ON electrode 216. Va (0, 0) indicates that no variation Va is applied to the OFF electrode 215 or the ON electrode 216. Va (1, 1) indicates that the voltage Va is applied to both of the OFF electrode 215 and the ON electrode 216.

FIGS. 9A, 9B, 10A, 10B, 11A, and 11B show exemplary configurations of the pixel unit 211 including the micromirror 212, the hinge 213, the OFF electrode 215, and the ON electrode 216, and the control timing diagrams for controlling the micromirror 212 in the ON state and the oscillating state.

FIG. 9A shows the application of a predetermined voltage Va only to the ON electrode 216 (Va (0, 1)). The micromirror 212 is pulled and tilted from the neutral position into an angular position along the direction of the ON state. The reflected light 512 reflected from the micromirror 212 is captured by the projective optical system 520, and projected as the projected light 513. FIG. 9B is a timing diagram for showing the quantity of light projected in the ON state.

FIG. 10A shows the application of a predetermined voltage Va only to the OFF electrode 215 (Va (1, 0)). The micromirror 212 is pulled and tilted from the neutral position into the OFF state, and enters the OFF state. The reflected light 512 deviates from the projective optical system 520 thus projected away from the projected light 513. FIG. 10B is a timing diagram for showing the quantity of light projected in the OFF state.

FIG. 11A shows a mirror state of free oscillation when the mirror is controlled with the maximum amplitude A0 between the tilt position (full ON) as the micromirror 212 touches the ON electrode 216 and the tilt position (full OFF) as the micromirror 212 touches the OFF electrode 215 (Va (0, 0)). The incoming light 511 is projected to the micromirror 212 oscillating between the ON and OFF states. The full quantity of light reflected when the micromirror oscillates to the ON direction and a partial quantity of light when the micromirror oscillates to an angular position between the ON direction and the OFF direction enter the projective optical system 520. The combined light projection is projected as the luminance, i.e., projected light 513, for the display of an image. FIG. 11B is a timing diagram shows the quantity of light projected in the oscillating state.

Specifically, in the ON state of the micromirror 212 shown in FIG. 9A, substantially all of the reflected optical flux travels in the ON direction and captured by the projective optical system 520 as the projected light 513. In the OFF state of the micromirror 212 shown in FIG. 10A, the reflected light 512 deviates from the projective optical system 520 in the OFF direction, and there is no reflected light projected as the projected light 513. In the oscillating state of the micromirror 212 shown in FIG. 11A, a part of the optical flux of the reflected light 512, diffracted light, scattered light, etc. are captured by the projective optical system 520, and projected as the projected light 513.

In the examples shown in FIGS. 9A, 9B, 10A, 10B, 11A, and 11B, the voltage Va represented by two values, that is, 0 and 1, is applied to each of the OFF electrode 215 and the ON electrode 216, but the levels of the Coulomb force generated between the micromirror 212 and the OFF electrode 215 and the ON electrode 216 can be increased by increasing the levels of the value of Va with greater values, thereby controlling the tilt angles or the frequency of oscillation of the micromirror 212 with greater degree of flexibilities.

Furthermore, in the examples shown in FIGS. 9A, 9B, 10A, 10B, 11A, and 11B, the micromirror 212 with hinge electrode 213a are assumed to have a ground potential. The tilt angle of the micromirror 212 can be controlled with greater degree of flexibility by applying an offset voltage to the micromirror 212.

In these embodiments and as will be described later, the amplitude of the tilt displacement of the micromirror 212 is controlled by generating free oscillation of the amplitude A1 and the amplitude A2 smaller than the maximum amplitude A0 between the ON and the OFF by applying Va (0, 1), Va (1, 0), and Va (0, 0) in appropriate timing during the tilt displacement of the micromirror 212 between ON and OFF. Greater number of grayscale levels is therefore achieved.

A method of displaying a picture using the display system 100 is described below. The control device 300 receives the binary picture signal 400 and divides the data into the separated data 410 and the separated data 420. Applying the separated data 410 and the separated data 420 of the picture signal, the first state control unit 321 and the second state control unit 322 calculate the time duration for the micromirror 212 to operate in the ON state in one frame of a picture. Accordingly, with the controlled durations, the micromirrors 212 of the spatial light modulation element 200 projects the image corresponding to the pixel of a picture. Thus, the time duration in which the micromirror 212 is controlled in the oscillating state depending on the frequency of oscillating the micromirror 212.

The first state control unit 321 and the second state control unit 322 of the control device 300 calculate the time durations. These durations are applied to control the micromirror 212 to operate in the ON state, the oscillating state. Furthermore, the frequency of oscillations of the micromirror 212 and the ratio of the quantity of light of the projected light 513 obtained by the oscillation in the oscillation time T of a predetermined micromirror 212 determine the quantity of light of the projected light 513 the same as the quality of light obtained by placing the mirror in the ON state in the oscillation time T. Using the calculated time duration or value of the frequency, the ON/OFF control and the oscillation-control are carried out on each micromirror 212 to project one frame of a image for one image pixel.

A control device 300 is described below as an exemplary embodiment to control free oscillation in the intermediate position between the ON state and the OFF state According to a time control diagram shown in FIG. 12. In the intermediate state between the ON state and the OFF state the free oscillation has amplitude A that is smaller than the maximum amplitude A0. Different control methods are further described blow.

(1) The Timing Method

The first method is to control the micromirror by applying two voltages, zero volt and Va, to the electrodes while the micromirror is at a GND state or zero volt.

Figure 12:
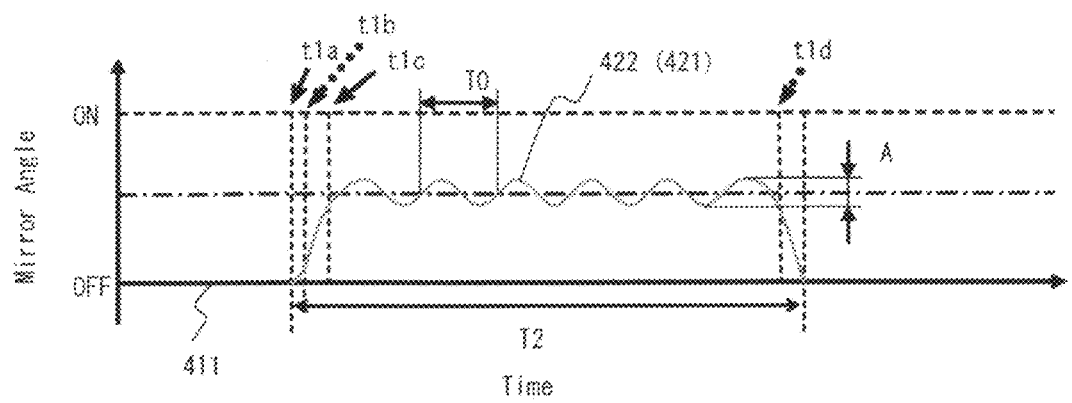
FIG. 12 is a diagram showing an embodiment of the oscillating state of the micromirrors in the display system according to an embodiment of the present invention.

FIG. 12 shows a time period 411 when the voltage Va(1, 0) is applied to the OFF electrode 215 and the ON electrode 216 of the micromirror 212 to control the mirror in the OFF state. At the time t1a, a voltage Va(0,0) is applied to the OFF electrode 215 and the ON electrode 216 of the micromirror 212 thus terminating the application of a Coulomb force applied between the electrodes and the micromirror. Then the spring force of the hinge 213 pulls the micromirror 212 back to the ON direction from the direction of the OFF state. In the period between t1b and t1c, a voltage Va(1, 0) is applied to the OFF electrode 215 and the ON electrode 216 to pull the micromirror 212 toward the OFF state in order to reduce the speed of the micromirror 212 which is moving toward the ON state. At time t1c, before the micromirror 212 is reaching the ON state, the voltage is turned off as represented by Va(0,0) applied to the OFF electrode 215 and the ON electrode 216. The Coulomb force between the electrodes and the mirror is set to zero. The micromirror 212 starts to freely oscillate with the amplitude A that is smaller than the maximum amplitude A0. At time t1d; Va(1, 0) is applied to the OFF electrode 215 and the ON electrode 216 of the micromirror 212, the oscillation of the micromirror 212 is stopped and the mirror is placed in the OFF state. The free oscillation period T2, or oscillation modulation period, is set to control the image display system to project images with desirable levels of gray scale. The levels of gray scale are determined by the number of the oscillation cycles and the light intensity contributed for image display in one cycle of the free oscillation, or from the time calculated by the light intensity per arbitrary free oscillation period T. The timing of t1a, t1b and t1c governs the amplitude A or the initial speed of the free oscillation of the micromirror 212. Therefore, setting the timing of t1a, t1b and t1c control the oscillation amplitude A.

The period between t1a to t1c is shorter than half of the free oscillation period of the micromirror 212, and also shorter than the half of the period defined by a least significant bit (LSB) in the control word applied in the PWM control. Especially, the period between t1a to t1b is shorter than the quarter of the free oscillation period of the micromirror 212, and is also shorter than the quarter of the period defined by a LSB in the control word applied in the PWM control. The time t1a through time t1d and the value of the voltage Va are determined by the first state control unit 321 and the second state control unit 322 of the data converter 320.

In this embodiment, the driving circuit of each electrode is simplified by making the voltage Va the same as the voltage applied in the PWM control for controlling ON/OFF states of the micromirror such that multiple levels of driving voltages are not required.

(2) Multiple Voltage Method

The Coulomb force generated by the voltage applied to the electrodes and the micromirror 212 governs the acceleration of the micromirror 212 moving between ON state and OFF state. Three levels of voltages, namely 0 volt, Va and Vb, are applied in the second method of controlling the micromirror 212. The micromirror 212 is set to zero volts or in GND state in this embodiment as well.

FIG. 12 shows a voltage Va(1, 0) is applied during a time period 411 to the OFF electrode 215 and the ON electrode 216 of the micromirror 212 to control the micromirror to operate in the OFF state. At time t1a, the voltage applied to the electrode is turned off as represented by a Va(0,0) applied to the OFF electrode 215 and the ON electrode 216 of the micromirror 212. By withdrawing the Coulomb force between the electrodes and the mirror, the spring force of the hinge 213 of the micromirror 212 pulls back the micromirror back to an angular position along the ON state from the original OFF state direction. In the period between t1b and t1c, a voltage Vb(1, 0) is applied to the OFF electrode 215 and the ON electrode 216 to pull the micromirror 212 toward the OFF state in order to reduce the speed of the micromirror 212 which is moving toward the ON state. The voltage Vb is greater than Va for applying a greater force to reduce the speed of the micromirror 212. At time t1c, before the micromirror 212 reaches the ON state, the voltage is turned off as represented by the voltage Va(0,0) is applied to the OFF electrode 215 and the ON electrode 216. As the Coulomb force between the electrodes and the mirror is reduced to zero, the micromirror 212 starts to oscillate freely with an amplitude A2 smaller than the maximum amplitude A0. At time t1d, a voltage Va(1, 0) is applied to the OFF electrode 215 and the ON electrode 216 of the micromirror 212 to stop the oscillation of the micromirror 212 and keep the mirror in the OFF state. The free oscillation period T2, or the oscillation modulation period, is set to control the micromirror to project a predefined levels of gray scale. The levels of gray scale are determined by the number of the free oscillation cycles and the light intensity contributing to the image display in one cycle of the free oscillation, or from the time calculated by the light intensity per arbitrary free oscillation period T.

In this control method, the timing of t1a, t1b and t1c are fixed and the voltage applied in the period between t1b and t1c are adjusted to govern the amplitude A2 or the initial speed of the free oscillation of the micromirror 212. The control voltage can control the amplitude A without changing the timing of t1a, t1b and t1c.

It is also understood that the same effect is achievable by applying other value than zero volts to the micromirror 212 in addition to the above description that implements the method by applying voltage to the electrodes.

Figure 13:
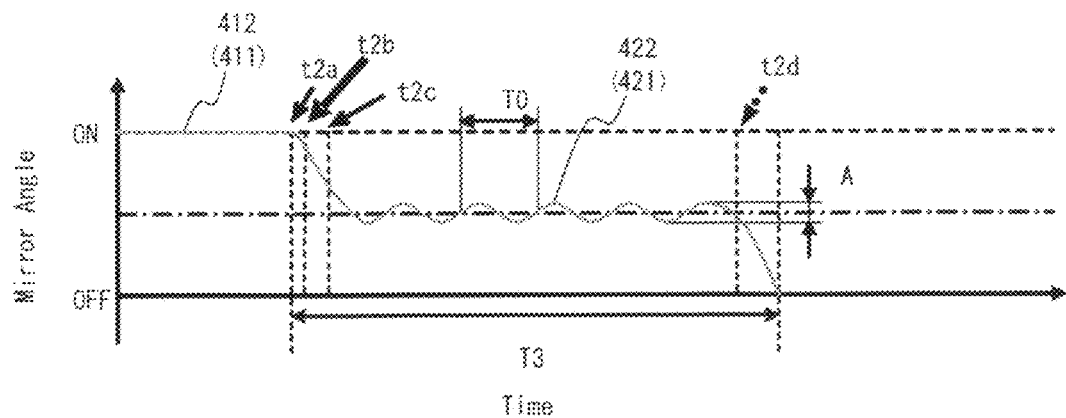
FIG. 13 is a diagram showing an embodiment of the oscillating state of the micromirrors in the display system according to an embodiment of the present invention.

FIG. 13 is a timing diagram that shows an example of controlling the mirror to operate with free oscillation in the intermediate state between the ON state and the OFF state starting from an initial ON state of a mirror. Described below is the sequence of voltage variations to control the mirror for operation in the oscillation state with the control device 300 according to the present embodiment.

FIG. 13 shows the voltage Va(0, 1) is applied in a time period 412 to the OFF electrode 215 and the ON electrode 216 of the micromirror 212 to control the mirror to move to a direction along the ON state. At time t2a, the voltage is turned off as represented by a voltage Va (0, 0) is applied to the OFF electrode 215 and the ON electrode 216 of the micromirror 212. The Coulomb force applied between the electrodes and the micromirror is withdrawn. The spring force of the hinge 213 pulls back the micromirror 212 to move to an OFF direction originally tilted toward the ON direction. In the period between t2b and t2c, a voltage Va (0, 1) is applied to the OFF electrode 215 and the ON electrode 216 to pull the micromirror 212 toward the ON state in order to reduce the speed of the micromirror 212 moving toward the OFF state. At time t2c, before the micromirror 212 reaches the OFF state, the voltage is again terminated as represented by a voltage Va(0,0) applied to the OFF electrode 215 and the ON electrode 216. The Coulomb force applied between the electrodes and the mirror is reduced to zero, and the micromirror 212 starts to freely oscillated with the amplitude A smaller than the maximum amplitude A0. At time t2d, a voltage Va (1, 0) applied to the OFF electrode 215 and the ON electrode 216 of the micromirror 212 stops the oscillation of the micromirror 212 and keeps the mirror in the OFF state.

The free oscillation period T3, or oscillation modulation period, is predefined to control the mirror for projecting images with a predefined levels of gray scale. The levels of the gray scale is determined by the number of the free oscillation cycles and the light intensity contributing to the image display in one cycle of the free oscillation, or from the time calculated by the light intensity per arbitrary free oscillation period T. The timing of t2a, t2b and t2c governs the amplitude A or the initial speed of the free oscillation of the micromirror 212. It is understood that adjustments to the timing of t2a, t2b and t2c determine the oscillation amplitude A. The first state control unit 321 and the second state control unit 322 of the data converter 320 determine the time t2a through time t2d and the value of the voltage Va.

The method to control the mirror oscillation amplitude A that is smaller than the maximum oscillation amplitude A0 by controlling the timing has been described. As described earlier, it is also possible to apply three or more levels of voltage to the electrode or controlling a voltage offset to obtain the same effect.

Figure 14:
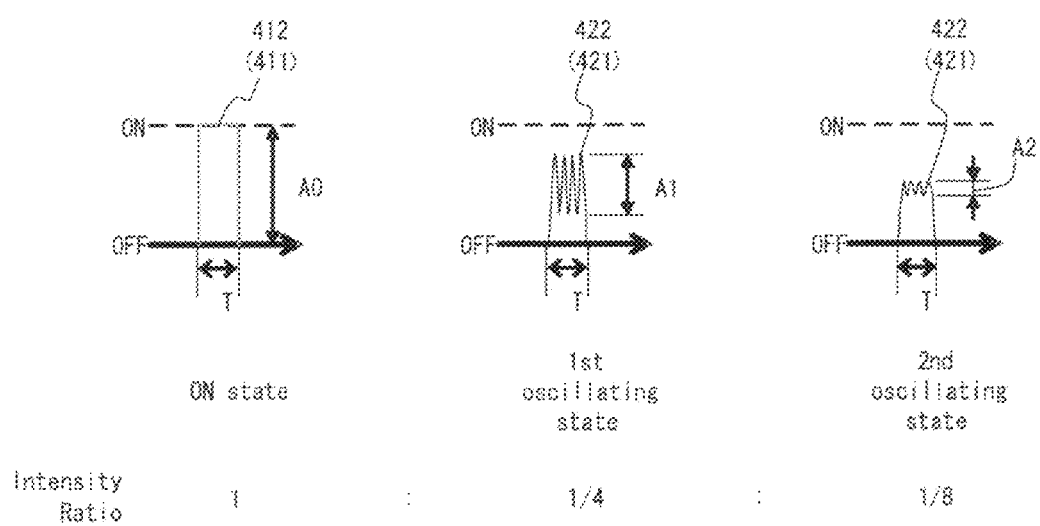
FIG. 14 is a diagram showing the principle of the improved gray scale by the oscillating state of the micromirrors in the display system according to an embodiment of the present invention.

FIG. 14 shows control methods as exemplary embodiment to achieve improved gray scale for image display. Specifically, FIG. 14 shows an example of projecting a controllable quantity of the projected light 513 by controlling the oscillation time T of the micromirror 212. By controlling the oscillation time T, about ¼ and ⅛ of the quantity of light is projected for image display by placing the micromirror 212 in the ON state for the same time duration by the control method shown in FIG. 12. The ¼ of the luminance ratio is realized by setting the amplitude A of the oscillation of the micromirror 212 as the amplitude A1, for example, 50%, with respect to the maximum amplitude A0. In addition, the ⅛ of the luminance ratio is realized by setting the amplitude A of the oscillation of the micromirror 212 as the amplitude A2, for example, 25%, with respect to the maximum amplitude A0. When the gray scale of 256 levels with an 8 bits control word to control the time Ton to operate at an ON state in one display frame the gray scale of 1024 levels controlled with 10 bits control word can be achieved by combining an 8-bit control method with the free oscillation (1st state) of the amplitude A1. Additionally, by combining the ON state control method with the control methods of adjusting the amplitude A1 as the first oscillating state, and adjusting the amplitude A2 as a second oscillating state during a free oscillation state, a higher level of gray scale display with 2048 levels, i.e., 11 bits) can be generated.

Figure 15:
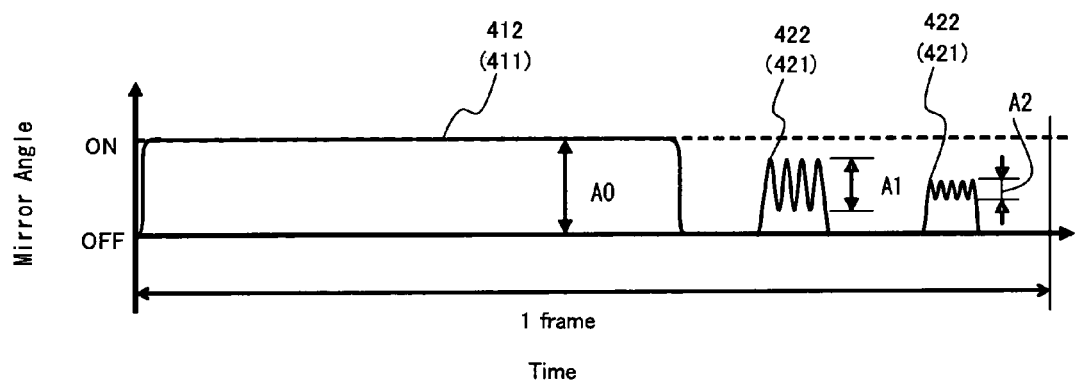
FIG. 15 is a diagram illustrating the improved gray scale by a combination of the ON state of the micromirrors and the oscillating state by the display system according to an embodiment of the present invention.
Figure 16:
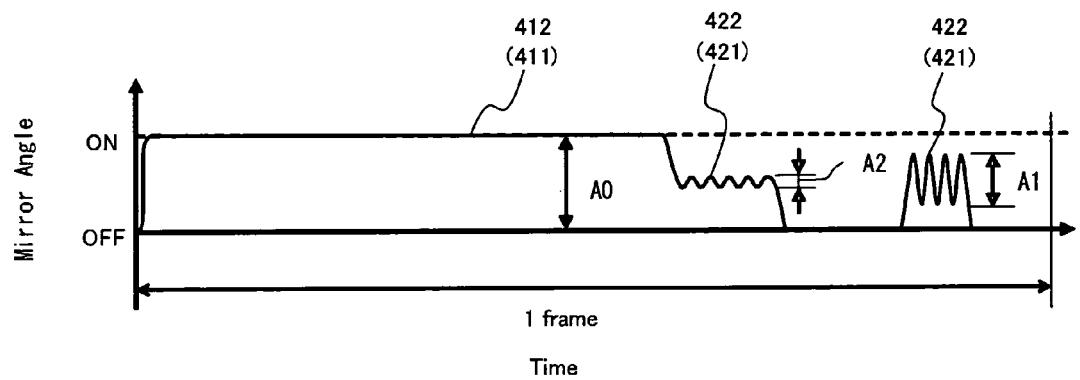
FIG. 16 is a diagram illustrating the improved gray scale by a combination of the ON state of the micromirrors and the oscillating state by the display system according to an embodiment of the present invention.

FIGS. 15, 16, 17, and 18 show different control methods for controlling the duration of the mirror operated in an ON state and amplitudes A1 and A2 of mirror oscillation to achieve image display with 2048 levels, 11 bits of gray scales. FIG. 15 is a timing diagram for showing a control method for sequentially and independently executing the oscillating state of the amplitude A1 and the amplitude A2 after the micromirror 212 is controlled to transfer from the ON state to the OFF state in one frame of the binary picture signal 400. FIG. 16 is a timing diagram for showing a control method for continuously operating the micromirror in an oscillating state of the amplitude A2 after the ON state followed by temporarily entering the OFF state and then executing the oscillating state of the amplitude A1 near the end of the display frame. FIG. 17 is a timing diagram for showing a control method for operating the micromirror 212 in an oscillating state of the maximum amplitude A0 after the transfer of the amplitude A2 from the OFF state. Then the micromirror is control to operate in an oscillating state with amplitude A1 temporarily through the OFF state near the end of the display frame. FIG. 18 is a timing diagram for showing a control method for operating the micromirror 212 in an oscillating state with amplitude A1 temporarily in an ON state. The micromirror 212 is then controlled to enter into an OFF state followed by operating temporarily in an oscillating state with amplitude A2 near the end of the display frame.

The control methods as illustrated in FIGS. 15 to 18, enable an image display system to achieve a gray scale of 2048 levels, i.e., 11 bits of the gray scale, by controlling the micromirror 212 to operate both in an ON state and free oscillation states of the amplitude A1 and the amplitude A2. As described above, free oscillations with amplitude A1 and A2 are within one frame period. The frame period is divided into sub-frames as separate periods operate the micromirrors 212 in different states in order to reduce the complication in controlling the micromirror.

Thus, by adjusting the amplitude A of oscillation, the micromirror is controlled to project an image light with an luminance of 1/n (n is an integer) of the full light luminance Lon when the micromirror 212 is controlled in the ON state for the same time duration T.

Combining the ON state and the oscillating state of the micromirror increases the levels of gray scale of the display images. In addition to the above-mentioned value of n, the mirror can be controlled to adjust the ratios of the light illumination by adjusting the oscillation amplitude to obtain the values of n=1.33 (as the luminance ratio of the ¾ of Lon), n=2, n=3, n=5, and n=10.

A functional relationship between the luminance Losc according to the oscillation-control in one frame period of picture data in a period of time Tosc for oscillation-control can be represented by the following equation.

$$Losc = Lon \times (1/n) \times (Tosc/T)$$

In order to display an image with the same luminance Losc, the micromirror can be controlled by either increasing the value of the integer n, extending the modulation time Tosc, or decreasing the value of the integer n to shorten the modulation time Tosc. Thus, reduction of the motion artifacts and color artifacts of a picture is achievable in an image display system implements a plurality of spatial light modulation elements by setting substantially equal timing of the control time for each of the spatial light modulation elements.

Furthermore, it is possible to control the oscillations of the micromirrors such that the luminance of the image display projected in one oscillation of the in the oscillation period T1 may be controlled to be 1/n of the luminance Lon2 projected in the ON state in the same oscillation period T1.

Accordingly, the relationship between the luminance Losc projected by micromirror with the oscillation-control in a frame period of the image display data and the number of oscillation time m of the micromirror can be represented by the following equation.

$$Losc = Lon2 \times (1/n) \times m$$

Therefore, in order to project the same luminance Losc, the micromirror may be controlled to increase the value of an integer n to increase the number of oscillation time m, or decreasing the value of the integer n to decrease the number of oscillating time of the modulation. Thus, reduction of the motion artifacts and color artifacts of a picture to be displayed the image display system can be achieved by using a plurality of spatial light modulation elements can be controlled to set substantially equal timing of the control time for each of the spatial light modulation elements.

As described above, according to the display system 100 of the present embodiment, image display with higher resolution of gray scale can be realized by using a spatial light modulation element 200 to display a picture by controlling and adjusting the modulation states of a plurality of micromirrors 212 without increasing the amount of data of the digital picture data (binary picture signal 400).

In addition, higher resolution of gray scale for image display can be achieved without requiring a complicated control such as increase/decrease of the quantity of light of the light source 510 or add an additional circuit. The higher resolution of gray scale may be achieved by using the spatial light modulation element 200 for displaying a picture by controlling the modulation states of the plurality of micromirror 212.

Higher resolution of gray scale can also be read in the picture display using a spatial light modulation element to display a picture by controlling and adjusting the modulation states of a plurality of micromirrors without increasing the speed of modulation-controlling the micromirrors into the ON state.

In addition, higher resolution of gray scale can be read in the picture display using a spatial light modulation element to display a picture by controlling and adjusting the modulation states of a plurality of micromirrors without requiring complicated control methods such as adjusting the intensity of the light sources or implementing additional circuits. The present invention is not limited to the configurations according to the above-mentioned embodiments, but various changes can be made within the gist of the invention.

Although the present invention has been described by exemplifying the presently preferred embodiments, it shall be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as falling within the true spirit and scope of the invention.

What is claimed is:

1. A display system, comprising:
a spatial light modulator projecting an image to be displayed using modulations depending on an ON state, an OFF state, and an oscillating state of a plurality of micromirrors; and
a control device controlling said spatial light modulator, wherein a luminance of projected image obtained by modulation of said oscillating state controlled during a period T by a control signal from said control device is 1/n of a luminance Lon of projected image obtained by modulation of said ON state controlled during said period T, wherein T is longer than one oscillation period of said micromirrors;
luminance Losc of projected image obtained by the modulation of said oscillating state in one frame period of said image is calculated by following equation $$Losc = Lon \times (1/n) \times (Tosc/T)$$

with respect to time Tosc in which said oscillation state is performed; and
1/n is smaller than 0.75 n is an integer;
Lon is defined as full light luminance;
Tosc is defined as modulation time.

2. The display system according to claim 1, wherein:
said oscillating state is performed to set an amplitude of said oscillation equal to or smaller than the maximum amplitude of said micromirrors.

3. The display system according to claim 1, wherein:
said value of 1/n is between appropriately 0.2 and appropriately 0.5.

4. The display system according to claim 1, wherein:
said value of 1/n is substantially smaller than 0.2.

5. A display system, comprising:
a spatial light modulator projecting an image to be displayed using modulations depending on an ON state, an OFF state, and an oscillating state of a plurality of micromirrors; and
a control device controlling said spatial light modulator, wherein a luminance of a projected image obtained by modulation of said oscillating state controlled in a time duration of one oscillation period T of said micromirrors by a control signal from said control device is 1/n of an luminance Lon of the projected image obtained by the modulation of said ON state controlled during said period T;
luminance Losc of projected image obtained by the modulation of said oscillating state in one frame period of said image is calculated by the following equation $$Losc = Lon \times (1/n) \times m$$

with respect to a number of times m at which said oscillation of the micromirrors is performed; and 1/n is smaller than 0.75 n is an integer;
Lon is defined as full light luminance.

6. The display system according to claim 5, wherein:
said oscillating state is performed to set the amplitude of said oscillation equal to or less than the maximum amplitude of said micromirrors.

7. The display system according to claim 5, wherein:
said value of 1/n is between appropriately 0.2 and appropriately 0.5.

8. The display system according to claim 5, wherein:
said value of 1/n is substantially smaller than 0.2.

* * * * *